(12) United States Patent
Begall et al.

(10) Patent No.: US 8,509,068 B2
(45) Date of Patent: Aug. 13, 2013

(54) METHOD AND DEVICES FOR ROUTING MESSAGES

(75) Inventors: Christoph Begall, Dortmund (DE);
Michael Kowalzik, Dortmund (DE);
Thorsten Trapp, Dortmund (DE);
Andreas Waadt, Duisburg (DE); Guido H. Bruck, Duisburg (DE); Peter Jung, Duisburg (DE)

(73) Assignee: Tyntec Ltd., Douglas, Isle of Man (GB)

( * ) Notice: Subject to any disclaimer, the term of this patent is extended or adjusted under 35 U.S.C. 154(b) by 892 days.

(21) Appl. No.: 12/094,085

(22) PCT Filed: Nov. 16, 2006

(86) PCT No.: PCT/EP2006/011006
§ 371 (c)(1),
(2), (4) Date: Oct. 14, 2008

(87) PCT Pub. No.: WO2007/057187
PCT Pub. Date: May 24, 2007

(65) Prior Publication Data
US 2009/0225732 A1 Sep. 10, 2009

(30) Foreign Application Priority Data
Nov. 16, 2005 (GB) ................................. 0523342.4

(51) Int. Cl.
*H04W 4/00* (2009.01)
(52) U.S. Cl.
USPC ............................ 370/230; 370/338; 370/400

(58) Field of Classification Search
USPC ................. 370/254, 328, 338, 351, 386, 400, 370/401, 466; 455/466
See application file for complete search history.

(56) References Cited

U.S. PATENT DOCUMENTS
2006/0034199 A1* 2/2006 Chu et al. ........................ 370/310
2006/0056364 A1* 3/2006 Owen ............................ 370/338

FOREIGN PATENT DOCUMENTS
EP 1 124 387 A2 8/2001
GB 2 399 994 A 9/2004

OTHER PUBLICATIONS
Waadt, A., et al., "A reconfigurable QoS monitoring framework for professional short message services in GSM networks (Abstract Only)", Jul. 11-15, 2005.

* cited by examiner

*Primary Examiner* — Donald Mills
*Assistant Examiner* — Mon Cheri Davenport
(74) *Attorney, Agent, or Firm* — Hultquist, PLLC; Steven J. Hultquist

(57) ABSTRACT

A system for sending a data packet from a messaging device to a receiving device in a signalling network (210) is described. The system comprises a distributed service center (255) a message receiving service center (290), a plurality of signalling units (260, 270) for passing the data packet to the receiving device, a central routing logic (280) for routing the data packets and a closed network connecting at least the central routing logic (280) and the plurality of signalling units (260, 270). Also disclosed is a corresponding method for sending a data packet from a messaging device to a receiving device.

21 Claims, 7 Drawing Sheets

METHOD AND DEVICES FOR ROUTING MESSAGES

CROSS-REFERENCE TO RELATED APPLICATIONS

This application is filed under the provisions of 35 USC §371 as a US national phase of International Application No. PCT/EP06/11006 filed Nov. 16, 2006, which in turn claims priority of British Patent Application No. 0523342.4 filed Nov. 16, 2005. The disclosures of such international application and British priority application are hereby incorporated herein by reference in their respective entireties, for all purposes.

FIELD OF THE INVENTION

The invention relates in to a system and a method for sending a data packet from a first communication network to a second communication network, in particular mobile communications networks.

BACKGROUND TO THE INVENTION

Packet transmission services have continuously gained in importance in mobile communications. Such services include the SMS (Short Message Service), first introduced in the GSM (Global System for Mobile Communications) protocol, and TCP/IP (Transmission Control Protocol/Internet Protocol) services. More details of these services are described in the book by M.-B. Pautet: The GSM system for mobile communications, published by the authors, ISBN 2-9507190-0-7, 1992; and in M. Rahnema: Overview of the GSM system and protocol architecture, IEEE Communications Magazine, vol. 31 (April 1992) no. 4, pp. 92-100.

In mobile communications, one example of a packet transmission service which has had tremendous economic success is the SMS used both in GSM and in GPRS (General Packet Radio Service) mobile communications networks. Principles of the SMS are described in G. Brasche, B. Walke: Concepts, services, and protocols of the new GSM phase 2+ general packet radio service. IEEE Communications Magazine, vol. 35 (August 1997) no. 8, pp. 94-104.

As it pointed out in J.-H. Park: Wireless internet access for mobile subscribers based on the GPRS/UMTS network, IEEE Communications Magazine, vol. 40 (April 2002) no. 4, pp. 38-49, a sustained high Quality of Service (QoS) level is mandatory and insisted upon by the senders of the messages. In order to enable the deployment of the packet transmission services like SMS in professional environments, it is necessary to define and maintain a pre-determined level of reliability for the packet transmission services and also to define and maintain attributes relating to precedence of packet transmission services as well as for the delay of the packet transmission service.

Unfortunately, sustained high QoS levels can usually not be guaranteed for the SMS transmission service, and SMS Centers therefore cannot currently provide the high service quality in all cases. In particular, the provision of the SMS suffers from packet losses, produced by e.g. time-outs, entailing forced packet deletions. These forced packet deletions are the consequences of protocols in the signalling domain of the infrastructure of a mobile communications network, including the Base Station System Application Part+ (BSSAP+) and the Mobile Application Part (MAP) protocols (this is discussed in J.-H. Park: Wireless internet access for mobile subscribers based on the GPRS/UMTS network. IEEE Communications Magazine, vol. 40 (April 2002) no. 4, pp. 38-49). The time-outs occur for various reasons, disturbances and network errors or obstacles, leading to failures in the delivery of the packets. For instance, when an origin terminal (i.e. the point of origin of the packet) and a destination terminal (such as the mobile station which can be for example a mobile phone or a data card) are subscribed to different network operators and the different network operators do not have a roaming agreement between them.

When the SMS is used for non-professional, i.e. private, communication from one subscriber to another subscriber, the lack of sustained high QoS levels may be acceptable. However, this is no longer the case for the deployment of SMS in professional scenarios.

In order to reduce the effect of packet losses and, hence, to improve the quality of the packet transmission service, a quantitative analysis of the QoS in the signalling domain can be carried out. To date, only a few QoS parameters have been defined by the standards bodies. The existing QoS parameters monitor the transmission quality only and cover only mobile-originated and mobile-terminated SMS. The existing QoS parameters do not cover transmissions to or from fixed line stations. The definitions of the QoS parameters are tailored for the end-to-end transmissions and include delivery time and completion rate as QoS parameters. The definitions are given in ETSI: Digital cellular telecommunications system (Phase 2); Mobile Application Part (MAP) specification (GSM 09.02 version 4.19.1) ETS 300 599 December 2000, and in ETSI: Speech processing transmission and quality aspects (STQ); QoS aspects for popular services in GSM and 3G networks; Part 2: Definition of quality of service parameters and their computation. ETSI TS 102 250-2 V1.2.1 (2004-06), June 2004.

Both A. Andreadis, G. Benelli, G. Giambene, B. Marzucchi. A performance evaluation approach for GSM-based information services. *IEEE Transactions on Vehicular Technology*, vol. 52 (2003) no. 2, pp. 313-325, and T. C. Wong, J. W. Mark, K.-C. Chua: Joint connection level, packet level, and link layer resource allocation for variable bit rate multi-class services in cellular DS-CDMA networks with QoS constraints. *IEEE Journal on Selected Areas in Communications*, vol. 21 (2003) no. 10, pp. 1536-1545, discuss the QoS parameters in their respective publications. The authors statistically model the packet traffic and present results on the related efficiency parameters.

To date the forced packet deletions mentioned above have not been taken into consideration. Furthermore, the existing QoS parameters (see the ETSI publications discussed above) do not completely fulfil the needs arising from a professional SMS.

Additional QoS parameters have been invented and described along with several measurement results in A. Waadt, G. Bruck, P. Jung, M. Kowalzik, T. Trapp, and C. Begall: A Reconfigurable QoS Monitoring Framework for Professional Short Message Services in GSM Networks. *IEEE International Conference on Service Computing*, vol. 2 (July 2005), pp. 22-29. These QoS Parameters can be measured within an SMS Center and in near real-time. A conceivable system framework for a QoS machine, controlling the QoS within a SMSC, is also described in this publication.

SMS Centers communicate with the infrastructures of service providers by using the SS7 (Signalling System 7) protocol, the additional QoS parameters consider the signalling domain explicitly. The additional QoS parameters have been applied to SMS in real GSM networks. To quantify the corresponding QoS levels, the signals and error acknowledgements, made available through the SS7 protocol, need to be calculated. These signals and error acknowledgements also cover SMS related services, which use signals from the MAP of the SS7 protocol.

Due to its popularity, roaming agreements for packet transmission services between network operators have been established all around the world. However, in some areas SMS roaming can sometimes be difficult. Quite often, small network operators are faced with numerous problems in establishing roaming agreements with larger network operators. Voice telephone calls between different mobile communications networks into foreign countries can be routed through the ISUP (ISDN User Part) using a fixed telephone network. However, the provision of SMS services requires roaming agreements between the network operators. That is the reason for scenarios in which customers are able to phone mobile stations, such as mobile telephones or personal digital assistants, in foreign countries, but are unable to use packet transmission services to the same mobile station. Currently, there are long waiting lists for the small network operators who want to establish roaming agreements with the major network operators. The major network operators are often unwilling to establish these roaming agreements because they fear an unwieldy number of roaming agreements. As a result there are restrictions in the service accessibility for packet transmissions, such as SMS services.

Together with the SMS service in the GSM protocol, there are other packet switched services which have sprung up in the last years and which are having similar compatibility problems like the SMS services. An example is found in North America in which the IS41 and IS95 protocols are used in TDMA (Time Division Multiple Access) and CDMA (Code Division Multiple Access) networks (e.g. CdmaOne, Cdma2000).

Even providers of the popular Instant Messaging (IM) Services (e.g. ICQ, MSN Messenger, IRC or AIM) are beginning to connect their IM networks, in order to get over the obstacles of communication restricting incompatibility. Currently there are many different protocols used by the different IM providers. Some of the most important protocols include Jabber (XMPP), whose protocol is an accepted internet standard, and SIP (Session Initiation Protocol), which is created by the IETF (Internet Engineering Task Force) and popular for its packet switched telephoning use ("voice over IP").

The above-mentioned services use central mapping servers, which provide status and routing information to the different devices, mobile stations (MS), etc. (collectively called service clients). To be reachable, the service client notifies the central mapping server about its status and location, when the service client is turned on or changes its address. When the service client, that wants to initialize a connection with a target device, has the requested routing information from the central mapping server, the service client is able to connect to the target device directly through a network, without further detour over the central mapping server or another server.

In the case of a GSM network, a Home Location Register (HLR) provides the functionality of the aforementioned Mapping Server. The stored information about the mobile station (service client), are the IMSI (International Mobile Subscriber Identity) of the mobile station and its last known status or address, if the mobile station is reachable. This address is the global title (GT) of the Mobile Switching Center (MSC) which is connected with a base station having a radio link to the mobile station. The GT of the MSC (the MSC-GT) is routing information to that MSC and therefore routing information to the mobile stations which are located in the NSS (network and switching subsystem) of that MSC.

A SMS Center (SMSC) in a GSM network uses only three MAP primitives of the SS7 protocol to transmit short messages. Every command delivers a status report. The interpretation of these status reports at the SMS Center facilitates the generation of various error codes, including the acknowledgement of the successful delivery of the SMS.

It is possible for a service subscriber to change its subscription and thus its home network from a first network operator OP1 to a second network operator OP2. The service subscriber is generally able to keep his old called party address or MSISDN (Mobile Station Integrated Services Digital Network) number when changing—this is known as porting the MSISDN. Usually the mapping server (HLR) of the mobile station, which was ported from the first network operator OP1 to the second network operator OP2, is located in the second network OP2.

Suppose now that a sender wishes to send an SMS to the service subscriber of the ported mobile number. The sender is subscribed to a message originating operator (OP). This message originating operator has roaming agreements with the first network operator OP1 which is the number range holder of the MSISDN of the ported mobile number. As long as the message originating operator also has a roaming agreement with the new home operator (second network operator) OP2 of the service subscriber, no problems occur: In order to retrieve routing information to the destination subscriber (here: the ported mobile number), the message originating operator (OP) will send a MAP command, querying for routing information, to the number range holder of the called party address, the MSISDN of the destination subscriber. This number range holder is the first network operator OP1. If, as usual, the mapping server or HLR, which is responsible for the ported destination subscriber, is located in the second network OP2, a Signalling Relay Function for support of Mobile Number Portability (MNP-SRF) of OP1 will forward the querying MAP command to OP2. The mapping server (HLR) of OP2 responsible for the ported destination subscriber will answer the query with an acknowledging signal, which is sent to the message originating operator (OP). If, however, the message originating operator OP has no agreement with the first network operator (number range holder) OP1, no communication between the message originating operator OP and the first network operator OP1 is possible. On the other hand, if the message originating operator OP has an agreement with the first network operator OP1, but no agreement with the second network operator OP2 (and now home network of the service subscriber), the acknowledging answer from the mapping server (HLR) of OP2 will not reach the origination operator (OP), due to the absence of roaming agreements between OP and OP2. The message originating operator OP does not get any answer as to the sent MAP command and may only guess the reason.

Several patents and applications are known which address the problem of improving the service between mobile communications networks.

US patent application 2005-0124302 (Yoon et al.) teaches a method to improve the service within wireless systems which collaborate. The HLR information is periodically updated and synchronized through interfacing between the wireless network systems.

The U.S. Pat. No. 6,832,089 (Nilcom) teaches a method which addresses the problem of number portability or incomplete number plans within the same country. A computer with SS7 connections is used as an SMSC relay to relay the short messages sent by an operator OP to a subscriber of a first network OP1 visiting a second network OP2, OP2 having no roaming agreement with the network OP. The SMS is sent with the global title GT of the visited MSC to a companion SMSC in a network which does have a roaming agreement with the second network OP2. The computer is capable of interrogating all of the HLRs of the country in which the number portability is operated. A database is built in a cache memory of the computer for all the mobile subscribers of the country in which the portability is operated so that the computer will know which HLR to interrogate, without searching, once the HLR has been found a first time.

The U.S. Pat. No. 6,512,926 teaches a dynamic routing system for transmission of SMS. A numbering plan contains the numbers of the short message transmission centers (SMSC) and the possible interconnections between the different SMSCs and the switching centers (MSC) of the networks of the called mobile telephone. A numbering plan manager defines from the number of the called party the relay transmission center or centers (SMSC) in order to reach the switching centre (MSC) visited by the intended recipient of the short message (SMS).

Various approaches to improve the delivery of SMS between different network providers have been suggested in the prior art. However, none of the known approaches teaches a system or a method which allows a reliable, high quality of service for data packet transmission in an environment with several different network operators without roaming agreements. These operators can be possibly located in different countries.

SUMMARY OF THE INVENTION

It is therefore an object of the invention to ensure reliable packet transmission services between messaging devices and receiving devices in different communications networks.

It is furthermore an object of the invention to improve packet transmission services between messaging devices and receiving devices in different communication networks which provide number portability.

It is another object of the invention to provide a method which allows the determination of quality of service for packet transmission services, such as short message service, exchanged between communications networks without roaming agreement It is a further object of the invention to enable maintaining a high level of quality of service for a SMS-Center.

These and other objects of the invention are solved by a system for sending a data packet from a messaging device to a receiving device in a signalling network. The system comprises a distributed service center with a message receiving service center; a plurality of signalling units; a central routing logic; and a closed network connecting at least the central routing logic and the plurality of signalling units. The message receiving service center is part of the closed network also, but has also connections to other networks (e.g. SS7 or IP). The signalling network can be a mobile communications network, such as but not exclusively a GSM, CDMA or UMTS network. The signalling network could also be an Instant Messenger Network, such as but not exclusively Jobber, AIM, ICQ, MSN or IRC.

The signalling units might be operated by different communication network operators and/or might have different roaming agreements. The system provides a central routing logic which enables the message receiving center to pass the data packet via the central routing logic directly to the signalling unit with the highest probability to pass the data packet to the receiving device.

The invention further provides a distributed service center comprising a message receiving service center; a plurality of signalling units; a central routing logic; and a closed network connecting at least the central routing logic and the plurality of signalling units. The message receiving service center is part of the closed network also, but can also have connections to other networks (e.g. SS7 or IP).

The distributed service center with the closed network enables the collaboration of the signalling units of different network operators with different roaming agreements in a way which allows the sharing of resources. The distributed service center also allows a more easy sharing of information from response signals to signals sent into other mobile communication networks without the problems associated with transferring signals over the open networks which connect the mobile communications networks. Within the closed network, further quality of service parameters can be implemented and information can be made transparent, i.e. information on processes in different communication networks can be exchanged and thus the quality of service can be determined.

The invention further provides a method for sending a data packet from a messaging device to a receiving device comprising the following steps: the data packet from the messaging device is passed to a message receiving service center; a central routing logic, which is connected to the message receiving service center, passes the message to one or more signalling units from a plurality of signalling units which are connected to the central routing logic by a closed network. The one or more signalling units pass the message to one or more hubs.

The method enables the distribution of data packets within the closed network. Usually data packets would have to be sent into different communications networks. Information on load of signalling units and connection speed of communications networks can be shared between the signalling units and the central routing logic and can be used to determine the signal path with the best quality of service and/or the most efficient mode of the complete system.

DETAILED DESCRIPTION OF THE INVENTION

Figure 1:
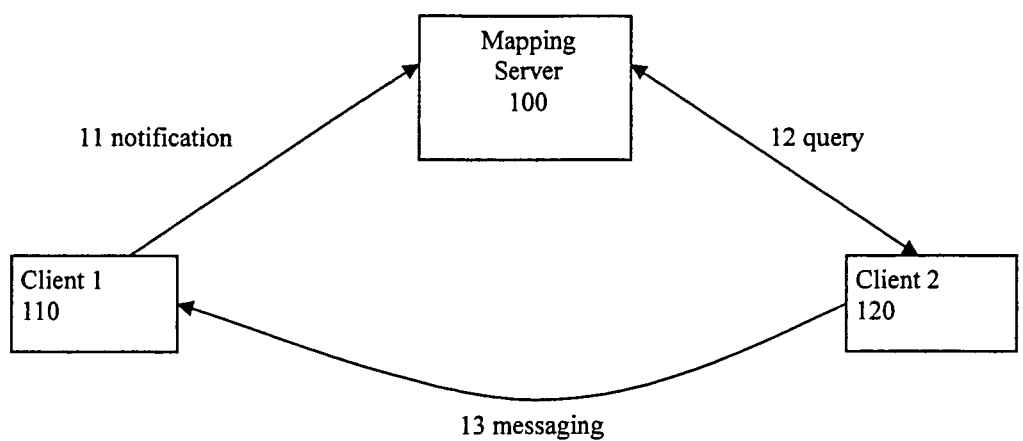
FIG. 1 shows a system for messaging with a central mapping server.

FIG. 1 shows schematically a system for messaging. The system has a central mapping server 100. Packet transmission services, such as SMS, ICQ, MSN Messenger, XMPP use the central mapping server 100 which provides status and routing information to service clients, such as mobile stations, which are shown as a first service client 110 and a second service client 120 on FIG. 1. To be reachable, the first service client 110 notifies the central mapping server 100 about its status and location, when it is turned on or changes the address. This is shown as a notification signal 11. In case of the GSM protocol, this is done by sending a notification signal to the HLR 140 (not shown in the FIG. 1). The notification signal contains the global title of the MSC (the MSC-GT) of the network and switching subsystem (NSS) in which the first client 110 roams. To contact another device, for example the second client 120, within the same mobile communications network, the first client 110 needs the called party address of the second client 120. In the GSM protocol this is the MSISDN (i.e. the telephone number). The MSISDN global title of the second client 120 comprises routing information to the mapping server 100 of the second client 120. Hence, a query 12, containing the called party address of the second client 120, can be answered by the mapping server 100 with the status and logical location of the second client 120 within the mobile communications network. When the first client 110, that wants to initialize the connection, has obtained the needed routing information from the mapping server 100, the first client 110 is able to connect to the second client 120, directly through the mobile communications network, without further detour over the central mapping server 100. This is shown as messaging signal 13.

Figure 2:
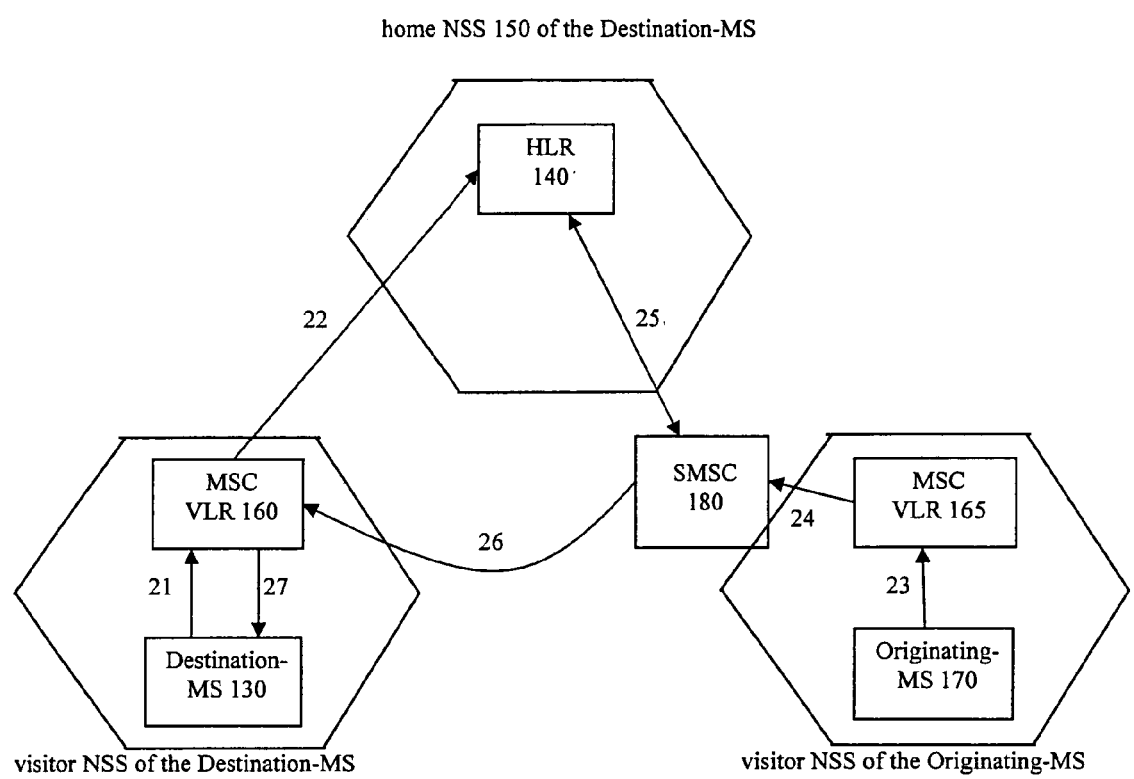
FIG. 2 shows the system of FIG. 1 for handling of SMS in GSM.

FIG. 2 shows how an SMS is sent in a GSM network as an example. Let us suppose that a destination mobile station 130 is roaming in a visitor network and switching subsystem. To be reachable, the destination mobile station 130 notifies the HLR 140 of its home NSS (network and switching subsystem) 150 about its location, when it is turned on or changes the NSS. This is done by a location update procedure in which the global title of the destination mobile station 130 is transmitted by update signal 21 to a VLR (Visitor Location Register) 160 of the network and switching subsystem (NSS) in which the destination mobile station 130 is located. The VLR 160 transmits this information to the HLR 140 via signal 22. The transmitted routing information (the global title of the mobile switching center, i.e. MSC-GT, and VLR) is stored into the HLR 140 for the destination mobile station 130 and can be used to route signals to the destination mobile station 130.

Suppose now that an SMS is originated by an originating mobile station 170 and is to be sent to the destination mobile station 130. The SMS is sent to the SMSC (SMS-Center) 180 which is responsible for the home NSS of the message originating MS 170 (signals 23 and 24 in FIG. 2). Then the SMSC 180 queries the routing information (the MSC-GT, IMSI) for the destination mobile station 130 from the HLR 140 (signal 25 in FIG. 2). Having obtained the routing information, the SMSC 180 forwards the SMS to the destination MS 130 (signals 26 and 27 in FIG. 2).

For the SMS Center 180 in a GSM network, several commands out of the MAP of the SS7 protocol are used to transmit short messages, namely:
MAP-SEND-ROUTING-INFO-FOR-SM (srism)

This command is used between a gateway MSC (Mobile Switching Center) and the HLR 140 (Home Location Register) to retrieve the routing information needed for routing the short message to a servicing MSC of the destination mobile station 130. This request for routing information from the SMS Gateway MSC contains the MSISDN (Mobile Subscriber ISDN) of the subscriber (i.e. destination mobile station 130), while the result contains the ISDN number (routing address aka "MSC-GT") of the Servicing MSC (i.e. MSC 160 of the visitor NSS). This address is used to forward the short message in a forward SM process.
MAP-FORWARD-SHORT-MESSAGE (fwsm)

This command is used to forward mobile originated or mobile terminated short messages between the SMS Gateway MSC, which has a connection to the SMS Center 180, and the Servicing MSCs.
MAP-REPORT-SM-DELIVERY-STATUS (rsds)

This command is used between the Gateway MSC and the HLR 140. When the transmission of a short message from the SMS Center 180 to the mobile station—such as the destination mobile station 130—is unsuccessful, e.g. because the subscriber was absent, the MSC, e.g. the MSC 160 of the visitor NSS, returns a negative response to the Gateway MSC and the Gateway MSC sends a Report SM-Delivery Status to the HLR 140 to allow for a delayed delivery of the short message. MAP-REPORT-SM-DELIVERY-STATUS is used to set the Message Waiting Data flag into the HLR 140 or to inform the HLR 140 of successful SM transfer after polling.

Every one of the commands delivers a status report. The interpretation of these status reports at the SMS Center 180 facilitates the generation of various error codes, including the acknowledgement of the successful delivery of the SMS. The mapping of error codes to their verbose description has not been standardized. Table I shows a conceivable mapping of error code numbers to verbose descriptions. Since the error code descriptions are not yet standardized other error codes descriptions are conceivable.

In order to enable a high QoS level and to keep the control of a SMS, it is important for the SMSC 180 or the message originating Operator, to retrieve all signal acknowledgments.

TABLE I

| ERROR CODES FOR MAP COMMANDS IN AN SMS CENTER | |
|---|---|
| Error code | Verbose description |
| 0 | Successful SMS Without Errors |
| 1 | TC-INVOKE Timeout |
| 2 | Unknown MSISDN |
| 3 | Absent Subscriber Short Message |
| 4 | Short Message Delivery Failure: SIM (Subscriber Identity Module)/ Mobile Terminal Memory Exceeded |

Figure 3:
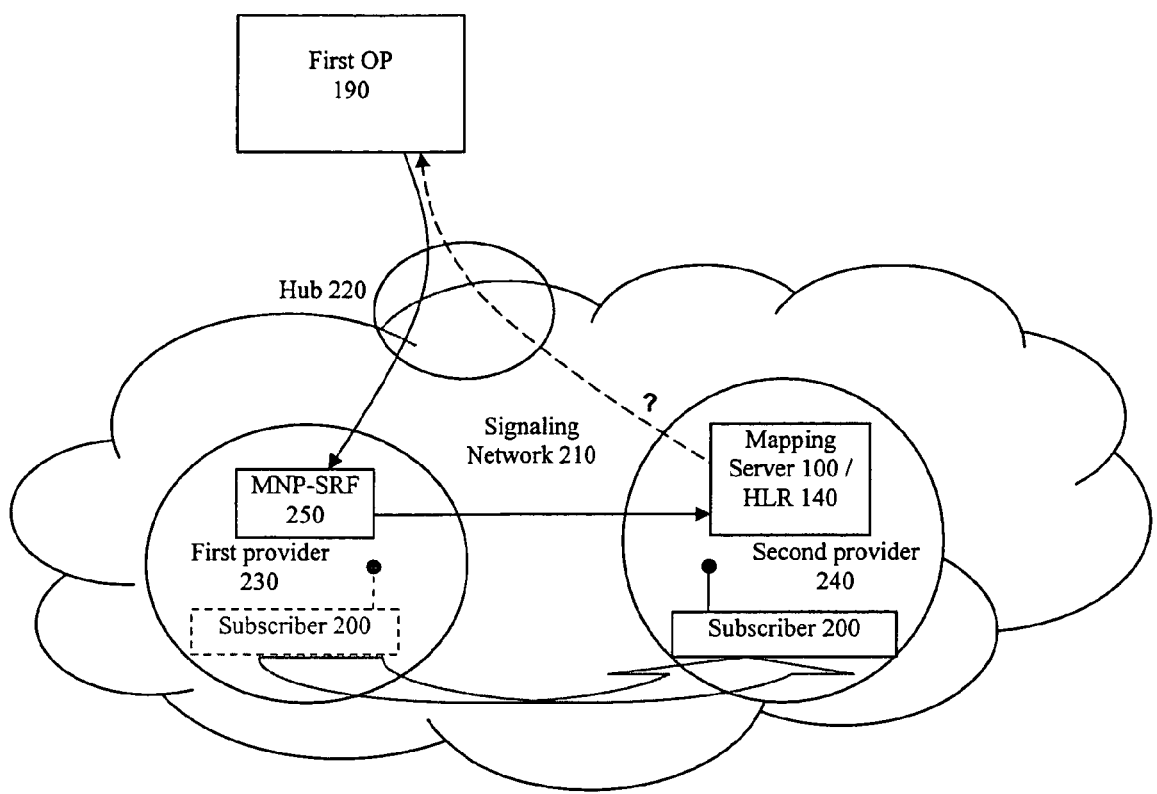
FIG. 3 shows a system for number portability.

FIG. 3 shows the situation of a first operator 190, which could be a mobile communications network operator or a SMSC operator, which communicates with a target subscriber 200 within a signalling network 210. A hub 220 in FIG. 3 denotes an access point which is used by the first operator 190 in order to connect to the signalling network 210 and to exchange signals with the signalling network 210. The hub 220 routes signalling commands, coming from the first operator 190 into the signalling network 210 and returns signals to the first operator 190 if the signals are addressed to the first operator 190. In case of SMS signals in a GSM network, for instance, the hub 220 would be the Gateway MSC (G-MSC), the signalling network 210 is the SS7 network of GSM and the called subscriber 200 could be a mobile station (MS).

When the called subscriber 200 wants to change from a first network provider 230 to a second network provider 240, the called subscriber 200 generally is able to keep his old called party address, (MSISDN), i.e. to port, as explained above. The first network provider 230 and the second network provider 240 can also be network operators or they could be "virtual providers" utilising networks established by network operators (MVNO's). The first network provider 230 of the called subscriber 200 and the new home network provider, the second network provider 240 to which the called subscriber 200 moves, have usually no contract to share a mapping server 100 or a HLR 140. The called party address is adopted by the new home network provider 240 and gets an entry, providing status and routing information, in a corresponding register of the mapping server 100/HLR 140 of the second network provider 240 which is the new home network provider.

Suppose now a message is to be sent to by the first operator 190 to the called subscriber 200. In order to retrieve destination information a querying signal is send with the called party address of the target subscriber from the first operator 190, therefore called querying message originating first operator, to the mapping server 100 (HLR 140). The querying signal has to be sent before the first operator 190 is able to build up a connection or send a message to the called subscriber 200. The called party address (ISDN, MSISDN) is interpreted by the hub 220, to which the querying signal is sent, as routing information to the network provider to which the number range of the called ISDN global title is assigned. This is no longer the home network provider of the called subscriber 200, if the called subscriber 200 has changed the network provider. In other words, the called party address is within the number range assigned to the original home network provider (the first network provider 230) and the called subscriber 200 has moved to the second network provider 240 as the new home network provider. A Signalling Relay Function for support of Mobile Number Portability (MNP-SRF 250) of the original home network provider (the first network provider 230) forwards the querying signal to the new home network provider (the second network provider 240) of the called subscriber 200. The mapping server 100 (HLR 140) of the new home network provider, i.e. the second network provider 240, answers the querying signal und returns a response signal back to the querying message originating operator, the first operator 190.

It is also conceivable that the original home network provider, the first network provider 230, and the new home network provider, the second network provider 240, collaborate and share the mapping server 100 (HLR 140) and the ported called subscriber 200 remains in the responsibility of its old mapping server (or HLR) of the first network provider 230. In this case, the signal, querying for the routing information to the called subscriber 200 does not have to be forwarded by the MNP-SRF 250.

In the following example we consider the common case that the mapping server of the called subscriber 200, e.g. a mobile station, which was ported from the first network provider 230 to the second network provider 240, is located in the network of the second network provider 240, thus being mapping server 100 (HLR 140). The querying signals, sent to the first network provider 230 (as the number range holder of the ISDN global title of the called party subscriber 200) are forwarded by the MNP-SRF 250 of the first network provider 230 to the new home network provider, the second network provider 240.

As explained above, as long as the message originating first operator 190 has roaming agreements with the number range holder (i.e. the first network provider 230) as well as with the new home network, the second network provider 240, of the called subscriber 200, no problems occur. If the message originating first operator 190 has no agreement with the number range holder (the first network provider 230), no communication between the message originating provider 190 and the number range holder (first network provider 230) is possible. On the other hand, if the message originating first operator 190 has an agreement with the number range holder (the first network provider 230), but no agreement with the new home network provider (the second network provider 240) the querying signal will be forwarded to the new home network provider, but the response of the target mapping server 100 (HLR 140) will not reach the message originating first operator because of the absence of a roaming agreement between the new home network provider where the mapping server 100 (HLR 140) is located and the message originating first operator. In this case, the message originating first operator 190 does not get a response to the signal. A routing failure occurs or the signal times out without any acknowledgement and the message originating first operator 190 could merely be able to guess the reason.

A message originating first operator 190 with no roaming agreement for sending messages to a particular destination mobile communications network could order a service from another second operator, which can interact with the particular destination mobile communications network.

Figure 4:
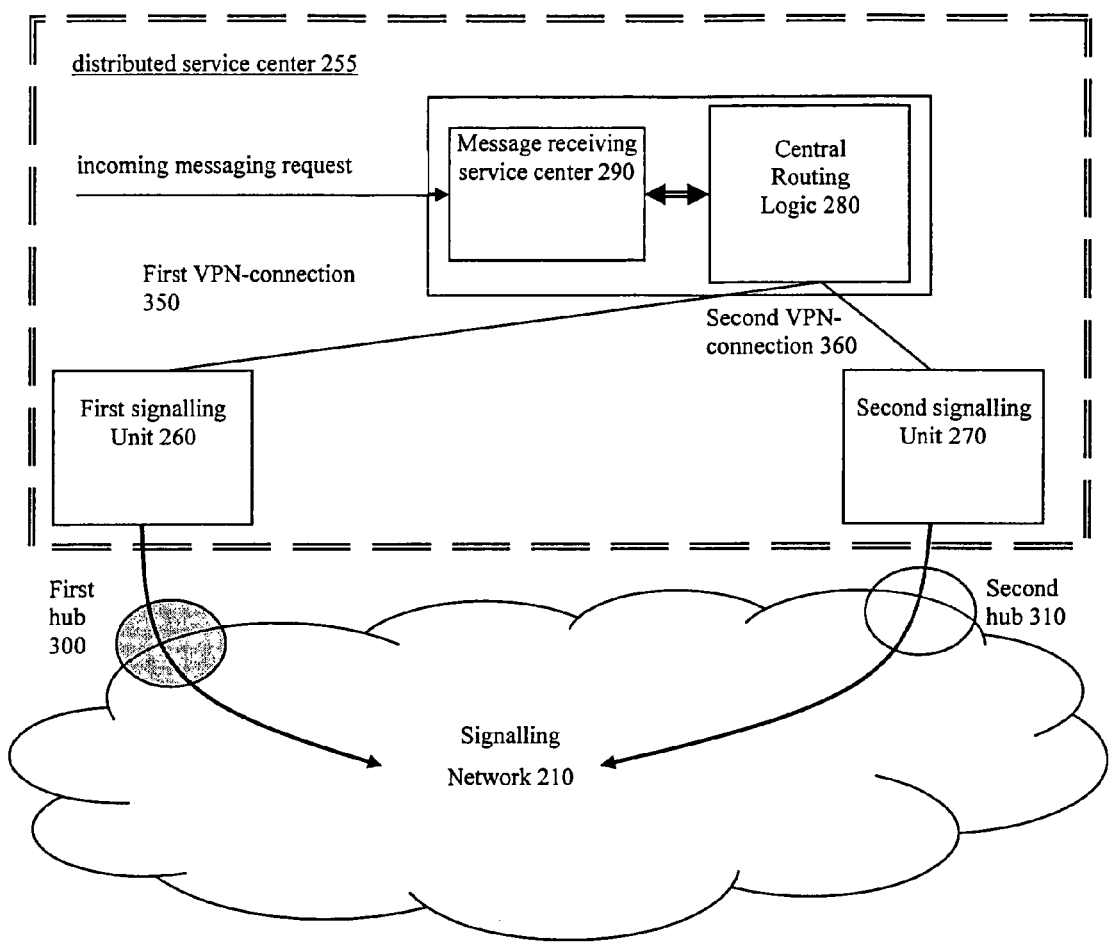
FIG. 4 Service Center with central Routing Logic.

FIG. 4 illustrates schematically a distributed service center 255 to remedy the problems of number portability as described above. A plurality of signalling units (shown in FIG. 4 as a first signalling unit 260 and a second signalling unit 270) is connected by a VPN (Virtual Private Network shown as first VPN connection 350 and second VPN connection 360) with a central routing logic 280. The signalling units 260, 270 and the central routing logic 280 could be connected with any type of closed network. The closed network could in another embodiment comprise user to user connections between the signalling units 260, 270 and the service center 280 or the signalling units 260, 270 and the service center 280 could be directly hardware connected or even operated on the same server. The signalling units 260, 270 can be operated by different operators with different roaming agreements and different network accessing possibilities. This includes other protocols like cdma or to certain extent but not limited to IP based messaging like IM services. The required protocol conversion is done in the signalling units 260, 270 and is in every case specific to the network with which they are inter-operating (e.g. different versions for ITU-T GSM, ANSI GSM, IS-41 compatible networks).

The central routing logic 280 can be a logical part of a message receiving service center 290, which is for example a short message service center. In a further embodiment the central routing logic 280 is an external device, which can be installed at a conventional short message service center. Signals from the message receiving service center 290 are distributed to the first signalling unit 260 and the second signalling unit 270. The signalling paths are allocated by the central routing logic 280. Access points which are used by the first signalling unit 260 and the second signalling unit 270 to send signals into the signalling network 210 and to receive signals from the signalling network 210 are called hubs as described above. The first signalling unit 260 sends and receives signals via a first hub 300 and the second signalling unit 270 sends and receives signals via a second hub 310 into the signalling network 210. The central routing logic on which 280 can be organised on a central server or replicated on every one of the signalling units 260, 270 on which such instances could also run.

Figure 5:
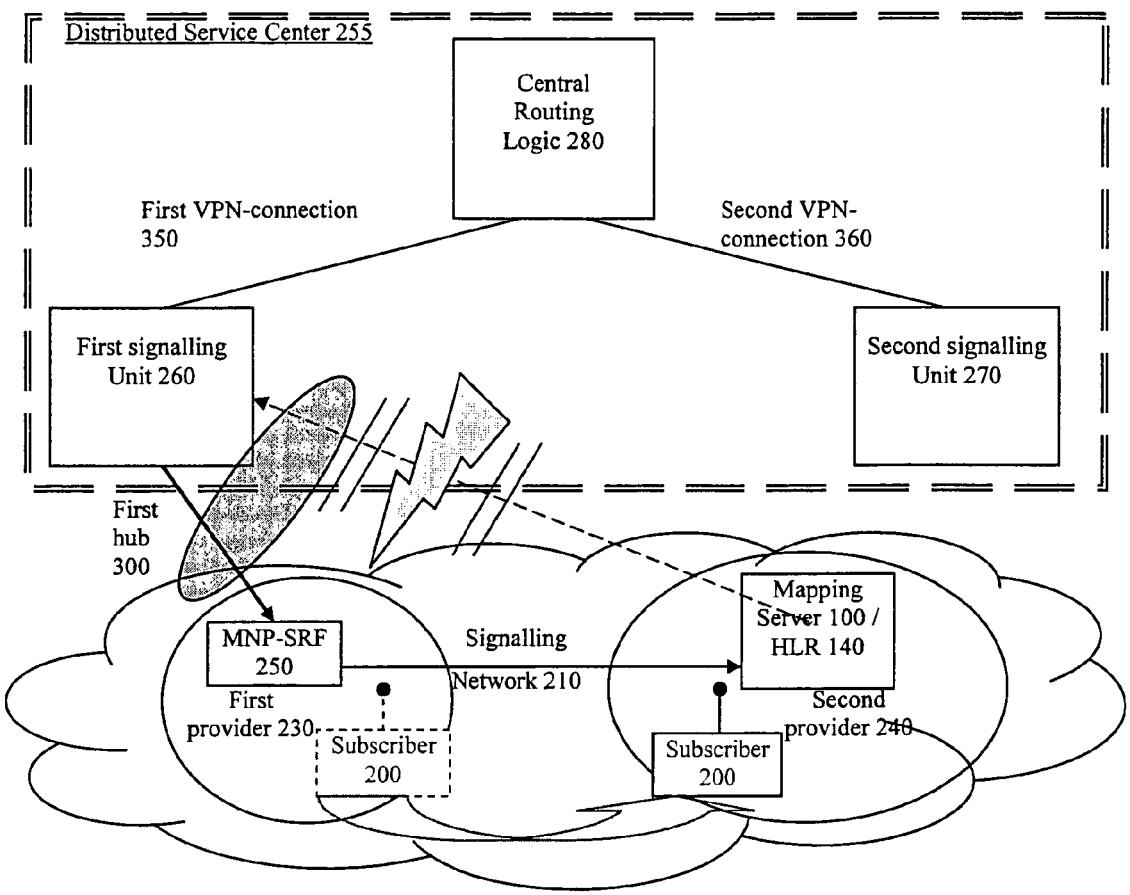
FIG. 5 Failed query by a Distributed Service Center.
Figure 6:
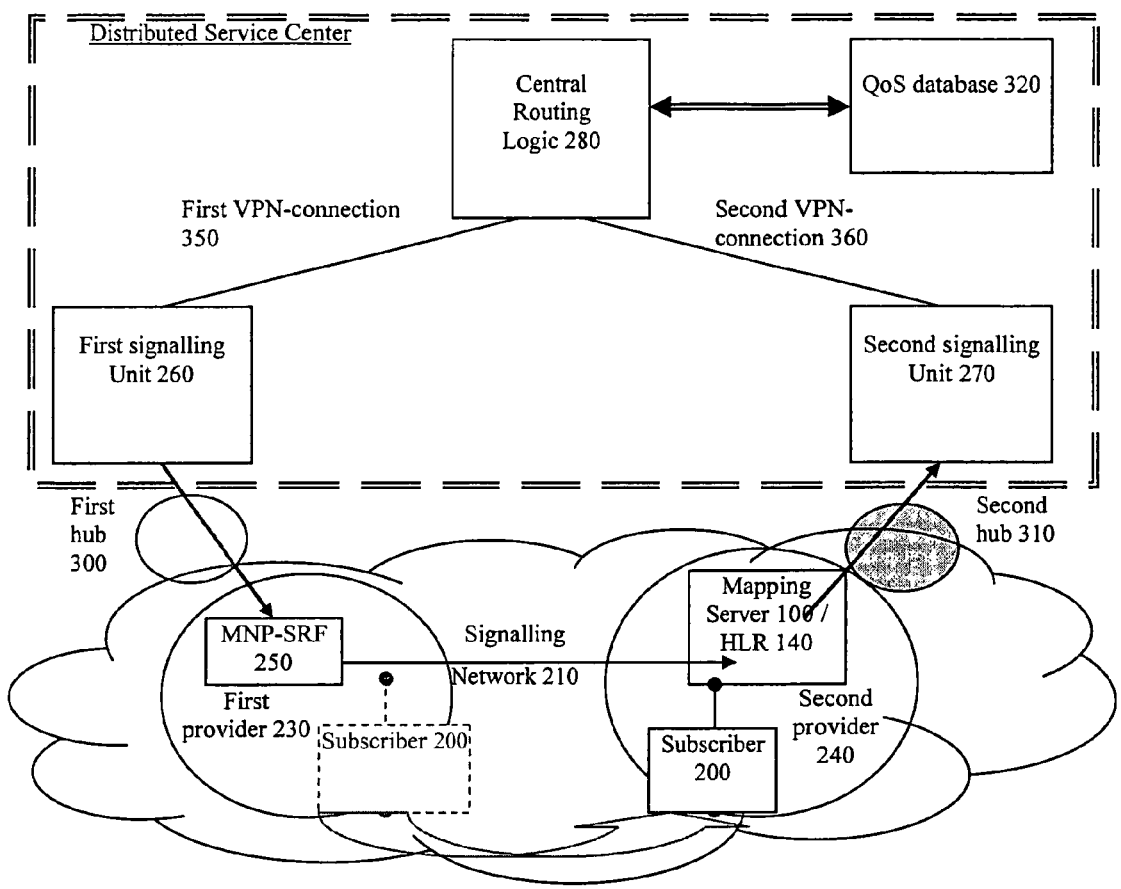
FIG. 6 Successful query by a Distributed Service Center.

FIG. 5 and FIG. 6 show the function of the distributed service center 255. The distributed service center 255 sends a query signal through the first hub 300 of the first signalling unit 260 to the first provider 230, which is the number range holder of the destination global title of the target device, the subscriber 200, in order to query the routing information to the subscriber 200. If the subscriber 200 was ported to a second provider 240 and the second provider 240 uses its own mapping server 100 (HLR 140), then the Signalling Relay Function for support of Mobile Number Portability 250 (MNP-SRF) of the first provider 230 forwards the signal to the second provider 240. If the second provider 240 has no roaming agreement with the first signalling unit 260, the response of the mapping server 100 (HLR 140) of the second provider 240 will not reach the first signalling unit 260 and the distributed service center 255 will not retrieve any acknowledging response.

FIG. 6 shows the central routing logic sending the querying signal through the first signalling unit 260 again, but this time with the source address of the second signalling unit 270 which has different roaming functionalities, i.e. agreements with at least partially different roaming partners, than the first signalling unit 260. Replacing the source address of the querying signal by the address of the second signalling unit 270 is an attempt to receive the answer of the mapping server 100 (HLR 140) by one of the signalling units, which has a roaming agreement with the second provider 240 (i.e. the new provider of the ported subscriber 200). If the second signalling unit 270 has also a roaming agreement with the first provider 230, the query signal can also be sent through the second signalling unit 270. The second signalling unit 270 will receive the response from the second provider 240 when the query signal is passed to the mapping server 100 (HLR 140) of the new target operator (i.e. the second provider 240) if the second signalling unit 270 and the second provider 240 have a roaming agreement. Further messaging with the subscriber 200 can then be done by sending the commands directly through the second signalling unit 270.

The gained knowledge about the background coherences within the communication network can be stored into a Quality of service (QoS) database 320, e.g. the path of srism commands from various hubs can be stored. The stored information can be used to reduce the trial and error combinations of various srism combinations. Before sending further messages, the central routing logic 280 of the distributed service center 290, can retrieve the information from the QoS database 320. By writing further information into the QoS database 320 and connecting the QoS database 320 with a QoS-Engine 330, which controls several QoS parameters, the QoS database 320 can additionally be used to achieve a homogeneous, maximized QoS for a plurality of signalling units 260, 270 and providers 230, 240 at the same time.

Figure 7:
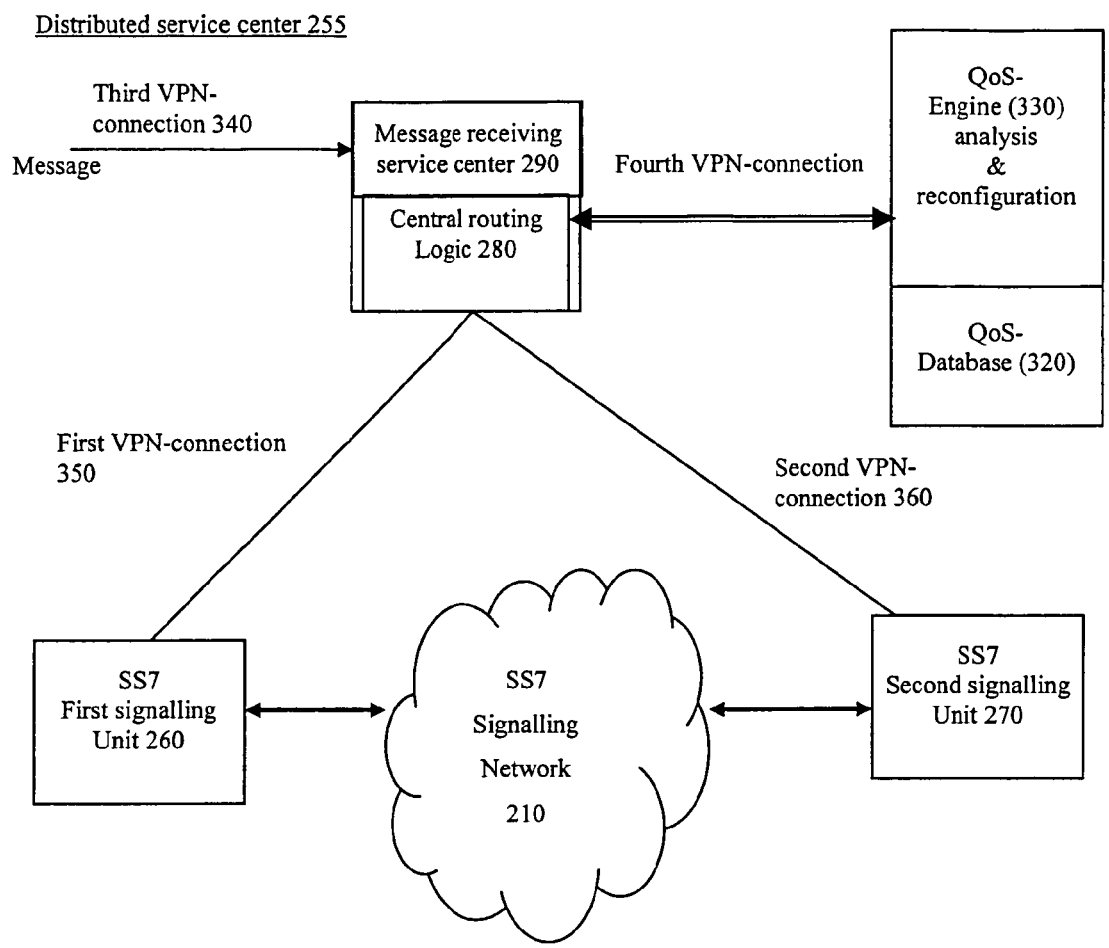
FIG. 7 Distributed SMSC with QoS-Engine.

FIG. 7 shows a distributed service center with QoS-Engine 330. The path from the signalling units 260, 270 to the signal receiving device in the signalling network 210 influences the SMS QoS parameters. Therefore the QoS parameters of the signalling units 260, 270 of different operators, which use different access points to connect to the SS7 signalling network 210, will be different for the SMS delivery to the same receiving device in a destination network and switching subsystem of the SS7 signalling network 210. In order to optimize the QoS and minimize the effort of the distributed service center 255 a separation between central routing logic 280 and signalling units 260, 270 is preferable. The signalling units 260, 270 of several operators are bonded together by the central routing logic 280 of a central message receiving service center 290. This acts as a supernet SMSC which is responsible for the delivery of incoming messages, distributes the necessary signalling jobs to the different signalling units 260, 270, and performs a QoS based management. The status information of the transmitted signals are returned to the central routing logic 280 and stored into the QoS database 320. A QoS-Engine 330, having access to the QoS database 320, evaluates the QoS parameters with respect to the different available signalling paths. The evaluated information can be used to obtain higher reliability performance and enables the accessibility of the subscriber 200, which became unreachable for a single signalling unit 260, 270, after the subscriber 200 has ported its number from a first provider 230 to a second provider 240.

In FIG. 7 a message is sent to the message receiving service center 290 through a third VPN-connection 340. In general, this third connection can also connect to an open network (e.g. IP or SS7). The incoming message is temporarily stored in a messaging database of the message receiving service center 290. The message lives and dies within the messaging database. The plurality of signalling units 260, 270 is connected to the routing logic by a plurality of VPN-connections (shown as a first VPN-connection 350 and a second VPN-connection 360 in FIG. 7). The signalling units 260, 270 can send the signals, which are used to deliver the message through the SS7 network. The signalling units 260, 270 provide different qualities of service and roaming agreements for the communication with receiving devices within the destination network of the providers 230, 240 in the SS7 signalling network 210. The decisions by which ones of the signalling units 260, 270 the MAP primitives are sent into the SS7 signalling network 210, is done by the central routing logic 280 and the decision is governed by the QoS engine 330. Both the QoS-Engine 330 and the central routing logic 280 are part of a virtual private network. All acknowledgements of the transmitted signals are stored into a QoS database 320, which is the basis of decision-making of the QoS-Engine 330. The message receiving service center 290 with the central routing logic 280, the QoS database 320, the QoS-Engine 330, the signalling units 260, 270 are connected within a virtual private network and are parts of the distributed service center 255.

LIST OF REFERENCE NUMBERS

| | |
|---|---|
| 11 | Notification |
| 12 | Query |
| 13 | Messaging |
| 21 | Notification about location to MSC VLR |
| 22 | Notification about location to HLR |
| 23 | Sending of SMS by Originating MS to MSC VLR |
| 24 | Sending of SMS by MSC to SMSC |
| 25 | Query of SMSC for routing information from HLR |
| 26 | Sending SMS from SMSC to MSC VLR |
| 27 | Forwarding of SMS form MSC VLR to destination MS |
| 100 | Mapping server |
| 110 | Client 1 |
| 120 | Client 2 |
| 130 | Destination MS 130 |
| 140 | HLR |
| 150 | Home NSS |
| 160 | MSC VLR |
| 165 | MSC VLR |
| 170 | Origination MS |
| 180 | SMSC |
| 190 | First operator |
| 200 | Target subscriber |
| 210 | Signalling network |
| 220 | Hub |
| 230 | First provider |
| 240 | Second provider |
| 250 | MNP-SRF |
| 255 | Distributed service center |
| 260 | First signalling unit |
| 270 | Second signalling unit |
| 280 | Central routing logic |
| 290 | Message receiving service center |
| 300 | First hub |
| 310 | Second hub |
| 320 | QoS Database |
| 330 | Quality of service engine |
| 340 | Third VPN connection |
| 350 | First VPN connection |
| 360 | Second VPN connection |

The invention claimed is:

1. A system for sending a data packet from a messaging device to a receiving device in a signaling network comprising a distributed service center with
   i.) a message receiving service center for receiving a data packet;
   ii.) a plurality of signaling units for passing the data packet to a receiving device, each of the plurality of signaling units using one or more associated hubs as an access point to send signals to a signaling network;
   iii.) a central routing logic for routing the data packet and directing the data packet to one of the plurality of signaling units according to routing information received in response to a request for the routing information; and
   iv.) a closed network connecting at least the central routing logic and the plurality of signaling units,
   wherein:
      the central routing logic enables the message receiving service center to pass the data packet via the central routing logic directly to a signaling unit of the plurality of signaling units with a highest probability of passing the data packet to the receiving device;
      the central routing logic uses information shared between the plurality of signaling units and the central routing logic when determining to which signalling unit of the plurality of signalling units the data packet is to be passed, the information comprising status information of transmitted routing signals;
      the information derived from response signals to data packets from the central routing logic is stored in a Quality of Service (QoS) database; and
      the information stored in the QoS database is processed by a QoS engine and the results of the processing of the information by the QoS engine is used for the decision of the central routing logic to which one of the plurality of signaling units the data packet is passed from the message receiving center.

2. The system according to claim 1, wherein the data packet comprises a Short Message Service (SMS) or Instant Messaging service.

3. The system according to claim 1, wherein the signaling network is a mobile communication network or an Instant Messaging network.

4. The system according to claim 1, wherein different ones of the plurality of signaling units are operated by at least two different operators.

5. The system according to claim 1, wherein the closed network is a virtual private network.

6. The system according to claim 1, wherein the closed network is based on internet protocol or Signal System #7 (SS7).

7. The system according to claim 1, wherein the messaging device and/or the receiving device is selected from the group consisting of a mobile station, personal digital assistant, a computer, an instant messaging device or a telephone.

8. A distributed service center comprising
   i.) a message receiving service center for receiving a data packet;
   ii.) a plurality of signaling units for passing the data packet to a receiving device in a signaling network, each of the plurality of signaling units using one or more associated hubs as an access point to send signals to a signaling network;
   iii.) a central routing logic for routing the data packet and directing the data packet to one of the plurality of signaling units according to routing information received in response to a request for the routing information; and
   iv.) a closed network connecting at least the central routing logic and the plurality of signaling units,
   wherein:
      the central routing logic enables the message receiving service center to pass the data packet via the central routing logic directly to a signaling unit of the plurality of signaling units with a highest probability of passing the data packet to the receiving device;
      the central routing logic using information shared between the plurality of signaling units and the central routing logic when determining to which signalling unit of the plurality of signalling units the data packet is to be passed, the information comprising status information of transmitted routing signals;
      the information derived from response signals to data packets from the central routing logic is stored in a Quality of Service (QoS) database; and,
      the information stored in the QoS database is processed by a QoS engine and the results of the processing of the information by the QoS engine is used for the decision of the central routing logic to which signal unit the signal is passed from the message receiving center.

9. The distributed service center according to claim 8, wherein the data packet comprises a Short Message Service (SMS) or Instant Messaging service.

10. The distributed service center according to claim 8, wherein the signaling network is a mobile communication network or an Instant Messaging network.

11. The distributed service center according to claim 8, wherein different ones of the plurality of signaling units are operated by at least two different communications network operators.

12. The distributed service center according to claim 8, wherein the closed network is a virtual private network.

13. The distributed service center according to claim 8, wherein the closed network is based on internet protocol or Signal Service #7 (SS7).

14. A method for sending a data packet from a messaging device to a receiving device in a signaling network comprising the following steps:
   i.) the data packet from the messaging device is passed to a message receiving service center;
   ii.) a central routing logic, which is connected to the message receiving service center, passes the data packet according to routing information received in response to a request for routing information to one or more different ones of a plurality of signaling units which are connected to the central routing logic by a closed network;
   iii.) the one or more signaling units pass the data packet to one or more hubs;
   iv.) information derived from response signals to data packets from the central routing logic is stored in a Quality of Service (QoS) database; and
   v.) the information stored in the QoS database is processed by a quality of service engine, and using the results of the processing of the information by the QoS engine for the decision of the central routing logic to which one of the plurality of signaling units the data packet is passed from the message receiving center,
   wherein:
      the central routing logic enables the message receiving service center to pass the data packet via the central routing logic directly to a signalling unit of the plurality of signalling units with a highest probability of passing the data packet to the receiving device; and the central routing logic using information shared between the plurality of signalling units and the central routing logic when determining to which signaling unit of the plurality of signalling units the data packet is to be passed, the information comprising status information of transmitted routing signals.

15. The method according to claim 14, wherein the data packet comprises a Short Message Service (SMS) or Instant Messaging service.

16. The method according to claim 14, wherein the signaling network is a mobile communication network or an Instant Messaging network.

17. The method according to claim 14, wherein the one or more different ones of the plurality of signaling units are operated by at least two different communications network operators.

18. The method according to claim 14, wherein the closed network is a virtual private network.

19. The method according to claim 14, wherein the closed network is based on internet protocol or Signal Service #7 (SS7).

20. The method according to claim 14, wherein the messaging device and/or the receiving device is selected from the group consisting of a mobile station, personal digital assistant, a computer, an instant messaging device or a telephone.

21. The method according to claim 14, wherein the central routing logic sends a querying signal through the first signaling unit with the source address of the second signaling unit.

* * * * *